United States Patent
Skupsch

(10) Patent No.: US 11,422,148 B2
(45) Date of Patent: Aug. 23, 2022

(54) APPARATUS FOR GENERATING TWO-DIMENSIONAL ILLUMINATION PATTERNS

(71) Applicant: Fraunhofer-Gesellschaft zur Foerderung der angewandten Forschung e.V., Munich (DE)

(72) Inventor: Christoph Skupsch, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 10 days.

(21) Appl. No.: 15/141,457

(22) Filed: Apr. 28, 2016

(65) Prior Publication Data

US 2016/0320290 A1   Nov. 3, 2016

(30) Foreign Application Priority Data

Apr. 28, 2015 (DE) .................... 10 2015 106 526.6
Jul. 28, 2015 (DE) .................... 10 2015 214 302.3

(51) Int. Cl.
*G01P 5/26* (2006.01)
*H04N 7/18* (2006.01)
(Continued)

(52) U.S. Cl.
CPC ............ *G01P 5/26* (2013.01); *G01N 15/1434* (2013.01); *G01N 15/1459* (2013.01); *G01N 15/1463* (2013.01); *G01P 5/001* (2013.01); *G02B 26/0833* (2013.01); *H04N 7/183* (2013.01); *G01N 2015/1075* (2013.01); *G01N 2015/1497* (2013.01)

(58) Field of Classification Search
CPC .......... H04N 7/183; G01P 5/26; G01P 5/001; G01N 2015/1075; G01N 2015/1497; G01N 15/1459; G01N 15/1434; G01N 15/1463; G02B 26/06

See application file for complete search history.

(56) References Cited

U.S. PATENT DOCUMENTS

| 8,629,978 B1 | 1/2014 | Estevadeordal et al. |
| 2008/0180648 A1 | 7/2008 | Mei et al. |

(Continued)

OTHER PUBLICATIONS

Bich, A. et al., "Multifunctional Micro-Optical Elements for Laser Beam", In: Photon Processing in Microelectrics and Photonics VII Proc. of SPIE vol. 6879, 2008, p. 1-12.

(Continued)

*Primary Examiner* — Dave Czekaj
*Assistant Examiner* — Berteau Joisil
(74) *Attorney, Agent, or Firm* — Perkins Coie LLP; Michael A. Glenn

(57) ABSTRACT

Apparatus for generating a two-dimensional illumination pattern of light beams, including: controller; a micromirror array; illuminator; collector; and a microlens array; wherein the controller is configured for tilting the micromirrors such that in the Fourier plane of the collector, intensity maxima of light collected by the collector can be generated, wherein the intensity maxima are each allocated to one of the microlenses, wherein from the respectively generated intensity maximum one of the light beams is generated by the respectively allocated microlens.

17 Claims, 11 Drawing Sheets

(51) Int. Cl.
  *G01N 15/14* (2006.01)
  *G02B 26/08* (2006.01)
  *G01P 5/00* (2006.01)
  *G01N 15/10* (2006.01)

(56) References Cited

U.S. PATENT DOCUMENTS

| | | | | |
|---|---|---|---|---|
| 2010/0265482 | A1* | 10/2010 | Schubert | G03F 7/70191 355/67 |
| 2010/0331672 | A1* | 12/2010 | Nolte | G01B 9/02082 600/425 |
| 2012/0327503 | A1* | 12/2012 | Manassen | G02B 21/0016 359/291 |
| 2013/0220009 | A1 | 8/2013 | Hoshishima et al. | |
| 2013/0278787 | A1* | 10/2013 | Shpunt | H04N 5/37452 348/218.1 |
| 2013/0319505 | A1* | 12/2013 | Yang | B32B 17/064 136/246 |
| 2014/0002828 | A1* | 1/2014 | Laffargue | G01F 17/00 356/627 |
| 2014/0043665 | A1 | 2/2014 | Deguenther et al. | |
| 2014/0192334 | A1 | 7/2014 | Chen et al. | |

OTHER PUBLICATIONS

Bruecker, C., "Digital-Particle-Image-Velocimetry (DPIV) in a Scanning Light-Sheet", Starting Flow Around a Short Cylinder, Exp Fluids 19 (4), 1995, pp. 255-263.

Estevadeordal, et al., "Curved Laser-Sheet For Conformal Surface Flow Diagnostics", In Exp Fluids 50 (3), S., 2011, pp. 761-768.

Mulder, et al., "Performance of a Programmable Illuminator for Generation of Freedom Sources on High NA Immersion Systems", Proc. of SPIE, vol. 7520, , Dec. 2009, 9 pages. Online: http://dx.doi.org/10.1117/12.837035.

Skupsch, C. et al., "Multiple-Plane Particle Image Velocimetry Using a Light-Field Camera", Opt. Express 21 (2), Jan. 2013, pp. 1726-1740.

* cited by examiner

APPARATUS FOR GENERATING TWO-DIMENSIONAL ILLUMINATION PATTERNS

CROSS-REFERENCE TO RELATED APPLICATIONS

This application claims priority from German Patent Application No. 10 2015 214 302.3, which was filed on Jul. 28, 2015, and from German Patent Application No. 10 2015 106 526.6, which was filed on April 28, 205, which are both incorporated herein in their entirety by reference.

BACKGROUND OF THE INVENTION

The invention relates to an apparatus for generating two-dimensional illumination patterns. Such apparatuses are used, for example, in particle image velocimetry (PIV).

Particle image velocimetry is a common measurement method in flow measurement technology. Here, an illumination pattern having the shape of a straight line in a plane transversal to the propagation direction of light is used for illuminating a flow. Such an illumination pattern is also called a planar light sheet. By means of a camera opposite to the apparatus for generating the illumination pattern, two pictures of trace particles lighting up in the light sheet can be generated at short time intervals. Subsequently, the velocities and directions of the trace particles are determined by comparing the two pictures. However, methods are known where the velocities and directions of the trace particles are determined from a single time-exposed picture.

With only a few exceptions, known apparatuses can only generate planar light sheets.

According to [1], non-planar light sheets can be generated with refractive optics, the same are, however, exclusively single-curved and only scalable to a limited extent. Additionally, the single-curved light sheets generated according to [1] cannot easily be displaced transversally to the propagation direction of light, such that the flow cannot be measured three-dimensionally. Additionally, the construction effort for the refractive optics with its movable parts is very high.

Velocity and direction measurements close to the wall are of particular interest for flow research. Measuring velocity gradients at the wall allows conclusions on friction losses of the flowing fluid. This type of energy dissipation has direct economic effects, such as in fluid transport, for example in pipelines, or in transportation, for example an airfoil of an aircraft. For measurement close to the wall of a planar wall, a planar light sheet can be irradiated into the flow parallel to the wall. Here, the distance between light sheet and wall can successively be reduced in order to determine the velocity gradient perpendicular to the wall.

If, however, the wall is structured, the flow within sinks can no longer be detected with a plane parallel or merely single-curved light sheet. If the planar or single-curved light sheet is brought closer and closer to the wall, the plane-parallel light sheet will be scattered at a certain degree of approximation to elevations of the wall structure, such that the measurement signal becomes useless.

SUMMARY

According to an embodiment, an apparatus for generating a two-dimensional illumination pattern of light beams may have: control means for controlling a sequence for generating the illumination pattern; a micromirror array for diffracting planarly incident coherent light comprising a plurality of micromirrors, which are each tiltable around at least one axis by the control means; illumination means for generating the planarly incident coherent light, which is controllable by the control means; collecting means for collecting light diffracted at the micromirror array; and a microlens array having a plurality of microlenses, wherein the microlenses comprise a common Fourier plane, which is disposed congruently with a Fourier plane of the collecting means; wherein the control means is configured for tilting the micromirrors such that in the Fourier plane of the collecting means, intensity maxima of light collected by the collecting means can be generated, wherein the intensity maxima are each allocated to one of the microlenses, wherein from the respectively generated intensity maximum one of the light beams is generated by the respectively allocated microlens.

According to another embodiment, an apparatus for optical determination of velocity fields in fluid flows may have: an inventive apparatus for generating a two-dimensional illumination pattern of light beams; and a camera for capturing the illumination pattern, wherein an objective of the camera is disposed such that an optical axis of the objective is disposed transversally to a propagation direction of the light beams of the illumination pattern, and wherein an exposure time of the camera is controllable by the control such that all light beams of one of the illumination patterns are captured in an image taken by the camera.

Apparatus for generating a two-dimensional free-form illumination pattern of light beams, comprising control means for controlling a sequence for generating the illumination pattern;

a micromirror array for diffracting planarly incident coherent light comprising a plurality of micromirrors, which are each tiltable around at least one axis by the control means;

illumination means for generating the planarly incident coherent light, which is controllable by the control means;

collecting means for collecting light diffracted at the micromirror array; and a microlens array having a plurality of microlenses, wherein the microlenses comprise a common Fourier plane, which is disposed congruently with a Fourier plane of the collecting means;

wherein the control means is configured for tilting the micromirrors such that in the Fourier plane of the collecting means, intensity maxima of light collected by the collecting means can be generated, wherein the intensity maxima are each allocated to one of the microlenses, wherein from the respectively generated intensity maximum one of the light beams is generated by the respectively allocated microlens.

Here, a light beam means a beam of light rays which are essentially oriented in parallel. Advantageously, the light beams have a round cross-section. In this case, the light beams ideally have a circular cylindrical shape. Due to a technically unavoidable divergence of the light rays of a light beam, the light beams have, however, in reality, the shape of a circular cone. A divergence or opening angle of a light beam in the sense of this document can here be less than 2°, advantageously less than 1°, particularly advantageously less than 0.5°.

The control means can in particular be an electronic control means.

A micromirror array is a microelectromechanical device for dynamic modulation of light. A micromirror array can consist of micromirrors arranged in a matrix shape, wherein the individual micromirrors have a tiltable reflecting area having an edge length of a few micrometers. Tilting can be caused, for example, by the force effect of electrostatic fields. Here, normally, each micromirror can be adjusted individually with respect to its angle with regard to one or with regard to two axes transversal to a mirror normal. The micromirror array can comprise several hundred thousands of micromirrors. Due to the tiltability of the micromirrors, the micromirror array can be used as an adjustable diffraction grating, such that the diffracted light forms particularly strictly limited intensity maxima with a suitable tilting of the micromirrors, which cannot easily be generated with other optical technologies, such as with reflective or refractive technologies.

The illuminating means can be any illuminating means which can radiate coherent light evenly on an active area of the micromirror array.

Further, the collecting means can in particular be a Fourier lens (collecting lens) or a concave mirror.

Here, a microlens array means an optical device including a plurality of microlenses which can in particular be arranged in a matrix shape.

The basic mode of operation of the inventive apparatus is as follows: coherent light is irradiated planarly on the micromirror array. Thereby, the control means tilts the micromirrors of the micromirror array such that for at least one of the microlenses in the Fourier plane of the collecting means an intensity maximum of the collected light results by diffracting the coherent light at the micromirror array and by collecting the diffracted light by means of the collecting means. Then, a light beam is generated from the intensity maximum of the collected light by means of the microlens allocated to the intensity maximum. Due to the above mentioned strict limitation of the intensity maxima that can be generated by means of diffracting at the micromirror array, the light beams generated in that manner have an extremely low divergence angle.

Here, the micromirror array can be controlled such that an intensity maximum can be generated for each of the existing microlenses. Thereby, a light beam can also be generated at each of the microlenses. If several light beams are generated simultaneously or successively, an illumination pattern of light beams results, which is freely formable in a two-dimensional manner of the control means in a plane transversal to the propagation direction by respective programming.

Thus, any two-dimensional illumination patterns are possible. Apart from the conventional straight-line or single-curved illumination patterns, in particular multiply and arbitrarily curved lines, multiply and arbitrarily bent lights, each continuous or broken, but also illumination patterns such as waves, steps and closed lines, such as circles, are possible.

If the inventive apparatus is used within particle image velocimetry, the illumination pattern can be adapted optimally to a wall limiting the flow, even when the same is structured in a complex manner.

A single free-form illumination pattern can be used for measuring flow velocities and directions in two space dimensions along profiled surfaces. If several corresponding illumination patterns are generated spatially offset, the flow can be detected three-dimensionally. Also, the inventive apparatus can be used in 3D shape measurement.

The incident coherent light can be re-shaped in an almost lossless manner by means of the micromirror array, such that high energy efficiency of the inventive apparatus results.

According to an advantageous development of the invention, an aperture diaphragm array having a plurality of aperture openings is disposed in the Fourier plane of the collecting means, wherein the aperture openings are each allocated to one of the microlenses.

The aperture diaphragm array can be a simple pinhole aperture.

The aperture diaphragm blocks unwanted diffracted light, which can result, e.g. due to the calibration uncertainty of the micromirrors and hence contributes significantly to a high contrast of the illumination pattern.

According to an advantageous development of the invention, the control means for tilting the micromirrors in that manner is configured such that a tilting angle of the micromirror corresponds to an integer plurality of a blaze angle.

Here, a blaze angle means an angle where the incident coherent light is completely diffracted to a first order intensity maximum. This results in a high energy efficiency of the apparatus. Further, this has the effect that intensity maxima of other orders do not occur, which would generate undesirable side light beams. The blaze angle depends in particularly on the wavelength of the incident light, the distance of the micromirrors and the angle of incidence of the incident light.

According to an advantageous development of the invention, the control means is configured such that the sequence for generating the illumination pattern comprises a plurality of clocks, wherein at least one of said light beams is generated in each clock. In that way, an illumination pattern can be generated with equal generation velocity, which is combined of any number of light beams. Here, clocking eases synchronization of the inventive apparatus with other apparatuses, for example with a camera, which serve, for example, to perform particle image velocimetry.

According to a functional development of the invention, the control means is configured such that the clocks each comprise a first partial clock for tilting the micromirrors in which the illuminating means is switched off, and a second partial clock for generating at least one of said light beams in which the micromirrors are unmoved and the illumination means generates the planarly incident coherent light. In that way, it is prevented that during tilting of the micromirrors light is emitted in an uncontrolled manner, which would reduce the contrast of the generated illumination pattern.

According to a functional development of the invention, the control means is configured such that in each clock exactly one light beam is generated, in which the micromirrors are tilted such that the micromirrors are oriented in parallel. In that way, the entire micromirror array acts as a so-called blazed grating, such that a particularly strictly limited intensity maximum is generated, whereby the divergence angle of the respectively generated light beam is minimized. Additionally, the energy of a light beam can be maximized in that manner.

According to an advantageous development of the invention, the control means is configured such that in each clock several light beams are generated, wherein each of the several light beams is generated by a group of micromirrors, which are tilted such that the micromirrors are oriented in parallel within one of the groups of micromirrors. In this embodiment, the micromirror array acts like a plurality of blazed gratings, wherein each of the group of micromirrors forms a small grating. In that way, the generation velocity of the illumination patterns can be increased.

According to an advantageous development of the invention, the micromirrors are tiltable around two axes by the control means, wherein a position of said intensity maximum of the collected light on the aperture diaphragm array can be controlled two-dimensionally by the control means.

In that way, it is possible to generate, at each arbitrary aperture opening, an intensity maximum by using all micromirrors, such that a particularly strictly limited intensity maximum is generated, whereby the divergence angle of the respectively generated light beam is minimized. Additionally, the energy of a light beam can be maximized in that way.

According to a functional development of the invention, the micromirrors are each tiltable around exactly one axis by the control means, wherein positions of several of said intensity maxima of the collected light on the aperture diaphragm array are each controllable by the control means along a straight line, wherein the straight lines of different intensity maxima run parallel and spaced apart. In this embodiment, several light beams can be generated simultaneously, which are spaced apart in a first direction, and which are displaceable in a second direction arranged transversally thereto. In that way, with a simplified micromirror array, two-dimensional illumination patterns can be generated at high velocities.

According to an advantageous development of the invention, the micromirrors are disposed along a common mirror array plane. Thereby, the structure of the micromirror array is simplified.

According to a functional development of the invention, the illumination means is configured such that the planarly incident coherent light is incident perpendicularly onto the micromirror array. Thereby, the calculations necessitated for adjusting the micromirror array are simplified.

According to a functional development of the invention, the illumination means includes a laser, advantageously a pulse laser. By means of a laser, it is possible to produce coherent light with high power density.

According to an advantageous development of the invention, the aperture openings have a round cross-section. Thereby, adaptation of the shape of the aperture openings to the shape of the intensity maxima can be obtained, which are at least approximately also round.

According to an advantageous development of the invention, adjacent light beams of the illumination pattern overlap in an operating distance measured from the microlens array, such that a line-shaped illumination pattern results. In this way, illumination patterns in the shape of continuous planar light sheet can be generated.

According to a functional development of the invention, the microlenses are disposed in one plane. Thereby, the structure of the apparatus is simplified.

Further, an apparatus for optical determination of velocity fields in fluid flows is suggested, comprising:

an apparatus for generating a two-dimensional illumination pattern of light beams according to the type described herein; and a camera for capturing the illumination pattern, wherein an objective of the camera is disposed such than an optical axis of the objective is disposed transversally to a propagation direction of the light beams of the illumination pattern, and wherein an exposure time of the camera is controllable by the control such that all light beams of one of the illumination patterns are captured in an image taken by the camera.

In this way, an improved apparatus for determining optical velocity fields in fluid flows results. In particular, measurements at highly structured walls can be performed close to the wall, which is not possible with the apparatuses known so far.

According to a functional development of the invention, the objective is a telecentric objective. Thereby, distortions in an image taken with the camera can be prevented.

BRIEF DESCRIPTION OF THE DRAWINGS

Embodiments of the present invention will be detailed subsequently referring to the appended drawings, in which.

DETAILED DESCRIPTION OF THE INVENTION

The same or similar elements or elements having the same or equivalent functions are provided with the same or similar reference numbers below.

In the following description, embodiments having a plurality of features of the present invention will be described in more detail for presenting a better understanding of the invention. However, it should be noted that the present invention can also be implemented by omitting individual ones of the described features. It should also be noted that features shown in different embodiments can also be combined in other ways as long as this is not specifically excluded or would result in any contradictions.

Figure 1:
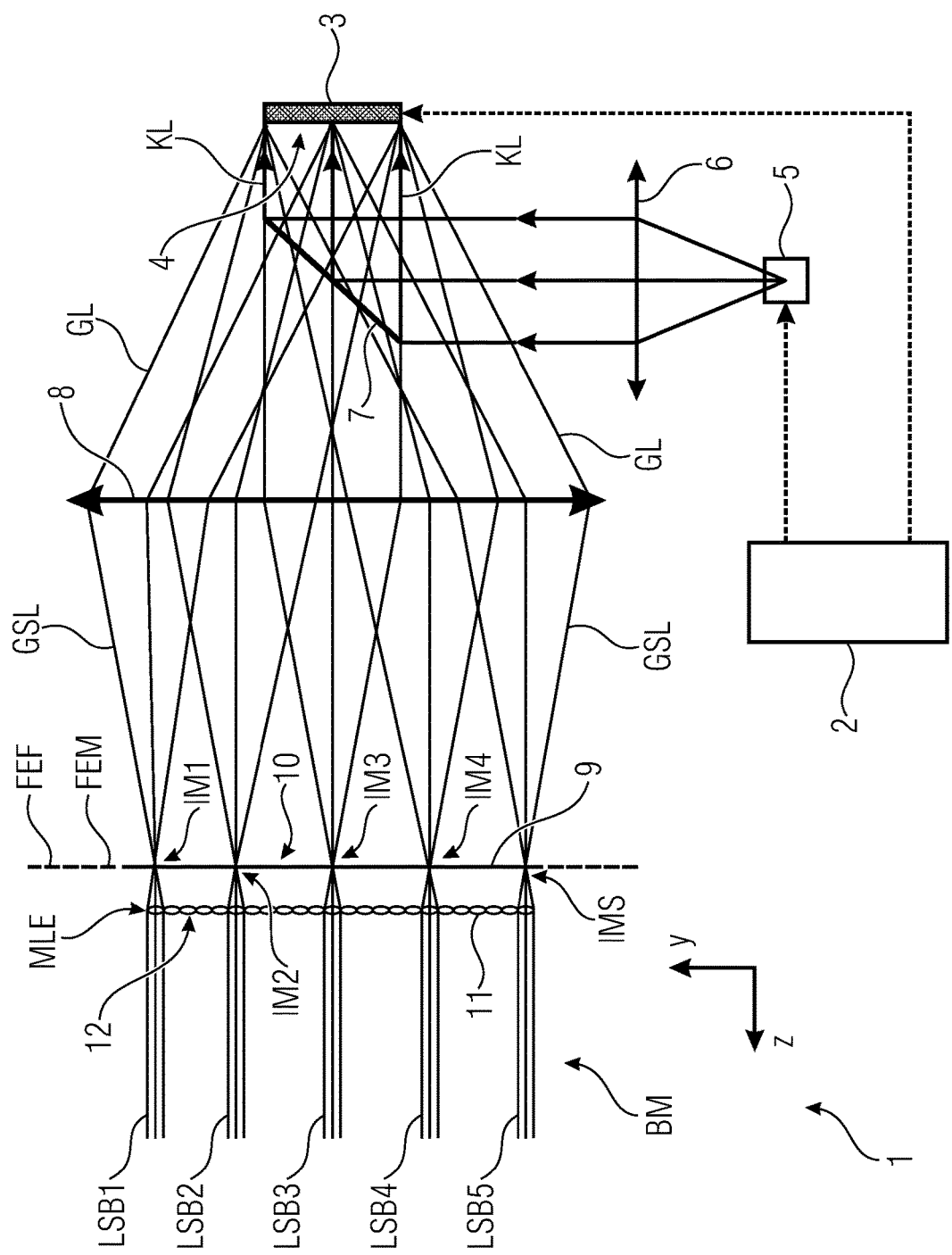
FIG. 1 is an inventive apparatus for generating a two-dimensional free-form illumination pattern of light beams in a schematic illustration.

FIG. 1 shows an inventive apparatus for generating a two-dimensional free-form illumination pattern of light beams in a schematic illustration.

The apparatus 1 for generating a two-dimensional illumination pattern BM of light beams LSB includes:

control means 2 for controlling a sequence SEQ for generating the illumination pattern BM;

a micromirror array 3 for diffracting planarly incident coherent light KL comprising a plurality of micromirrors 4, which are each tiltable around at least one axis by the control means 2;

illumination means 5, 6, 7 for generating the planarly incident coherent light KL, which is controllable by the control means 2;

collecting means 8 for collecting light GL diffracted at the micromirror array 3; and a microlens array 11 with a plurality of microlenses 12, wherein the microlenses 12 comprise a common Fourier plane FEM which is disposed congruently with a Fourier plane FEF of the collecting means 8;

wherein the control means 2 is configured for tilting the micromirrors 4 such that in the Fourier plane FEF of the collecting means 8, intensity maxima IM of light GSL collected by the collecting means 8 can be generated, wherein the intensity maxima IM are each allocated to one of the microlenses 12, wherein from the respectively generated intensity maximum IM one of the light beams LSB is generated by the respectively allocated microlens 12.

According to an advantageous development of the invention, an aperture diaphragm array 9 having a plurality of aperture openings 10 is disposed in the Fourier plane FEF of the collecting means 8, wherein the aperture openings are each allocated to one of the microlenses 12.

According to an advantageous development of the invention, the illuminating means 5, 6, 7 includes a laser 5, advantageously a pulse laser 5.

In the embodiment, the illumination means 5, 6, 7 includes a pulse laser 5, optics 6 and a partly transparent mirror 7, which are disposed such that coherent light KL is incident in a planar and even manner on the micromirror array 3.

According to an advantageous development of the invention, the illumination means 5, 6, 7 is configured such that the planarly incident coherent light KL is incident perpendicularly onto the micromirror array 3.

According to a functional development of the invention, the microlenses 12 are disposed in a plane MLE.

As illustrated in FIG. 1, a planarly irradiated mirror array 3 having at least one tilting axis can re-distribute light into smaller structures. Since the illumination is coherent, light spots IM can be generated in the Fourier plane FEF, which are significantly smaller than the diffraction image of an individual mirror 4. The entire micromirror array 3 having a diameter $D_{MMA}$ can be used for generating a single light spot IM. Then, by diffraction for its diameter, the following results: $d_{spot}$: $d_{spot}=2,44$ f $\lambda A/D_{MMA}$, with $\lambda$ being the wavelength and f the focal length of the collecting means 8. The necessity of small light spots IM will be discussed below.

The aperture diaphragm 9 lies in the Fourier plane FEF of the collecting means 8. The same blocks undesirably diffracted light which results, for example, due to the calibration uncertainty of the micromirrors 4. The diaphragm 9 can consist of a regular 2D hole pattern. The distance between aperture diaphragm 9 and microlenses 12 corresponds to the focal length of the microlenses 12. The distance of the particularly circular openings 10 of the aperture diaphragm can be equal to the lens array 11. Aperture diaphragm 9 and microlens array 11 are disposed such that an aperture opening 10 is allocated to each microlens 12 and both generally have the same optical axis.

The micromirror array can be illuminated in a collimated manner. The diffracted light GL can be focused onto the aperture diaphragm 9 by a collecting means 8. Diffraction spots IM passing the aperture diaphragm 9 are mapped to infinity by the microlens array. The resulting light beams LSB have the shape of "light cylinders" with very low divergence. Five of them are exemplarily illustrated, which can be generated sequentially. When juxtaposed, the same result in the illumination pattern BM.

Figure 2:
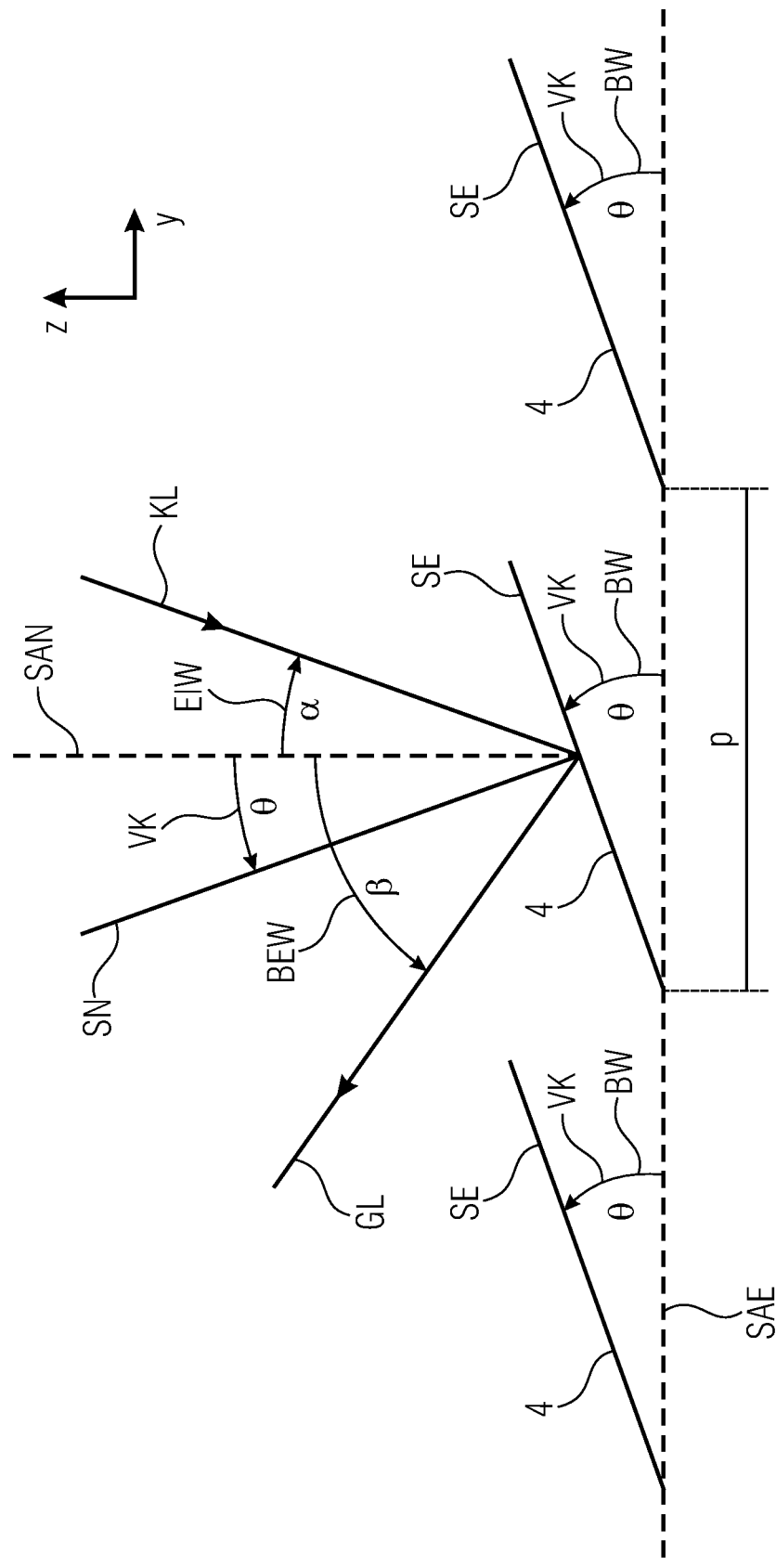
FIG. 2 is an outline for illustrating the ray path at a micromirror.

FIG. 2 shows an outline for illustrating the ray path at a micromirror 4.

According to an embodiment of the invention, the micromirrors 4 are disposed along a common mirror array plane SAE.

In the embodiment of FIG. 2, three micromirrors 4 are illustrated, whose mirror plane SE is tilted by the tilting angle VK with respect to the mirror array plane SAE. Here, the tilting angle VK corresponds to the angle between the mirror array normal SAN and the mirror normal SN.

Since the illustrated micromirrors 4 have the same tilting angle VK, the micromirrors 4 act like a blazed grating. When coherent light KL is incident at the incident angle EIW and the tilting angle VK corresponds to the blaze angle BW, the coherent light KL is completely diffracted into the first order, wherein the diffracted light GL comprises the diffraction angle BEW.

The blaze angle BW and the diffraction angle BEW are dependent on the mirror distance SA, the angle of incidence EIW and the wavelength of the coherent light KL.

According to an advantageous development of the invention, the control means 2 is implemented for tilting the micromirror 4 such that a tilting angle VK of the micromirrors corresponds to an integer plurality of a blaze angle BW. This ensures that the coherent light KL is only diffracted into one order, wherein the integer number corresponds to the respective order.

The mirror distance SA between two adjacent mirrors 4 is given by the blaze angle BW of the optical grating 3 generated on the micromirror array. With perpendicularly incident light KL, the following applies with good approximation $\theta_{m=1}$ $\lambda/p$, with $\theta_{m=1}$ being the blaze angle BW, p the mirror distance SA and m the integer number of the diffraction order. It should be noted that narrowest diffraction disks IM in the Fourier plane FEF with a pure torsion micromirror array 3 can only be generated by an integer plurality of the blaze angle BW.

Figure 3:
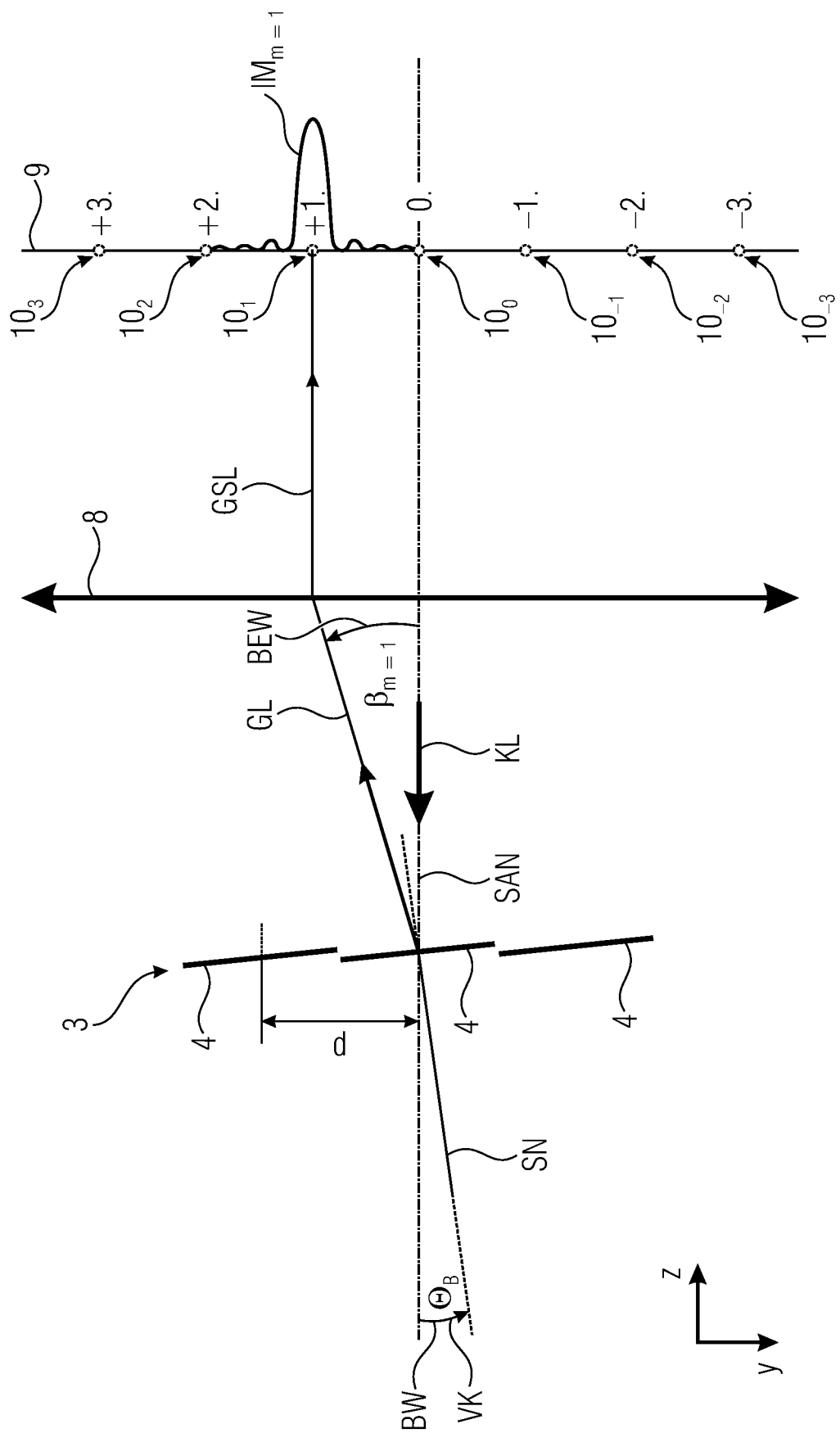
FIG. 3 is an outline where a first order intensity maximum is generated.

FIG. 3 shows an outline where a first order intensity maximum is generated. Here, the micromirror array 3 includes three micromirrors 4, wherein the diffracted light GL is collected by the collecting means 8 and the collected light GSL generates an intensity maximum $IM_{m1}$ at the aperture diaphragm array 9. In the case of FIG. 3, the angle of incidents EIW is 0°. All micromirrors 4 are tilted by the same tilting angle VK, such that the micromirror array 3 fulfills the function of a blazed grating. Here, the tilting angle VK corresponds to the blaze angle BW, such that the coherent light KL is completely diffracted into the first order. Here, the micromirror array 3, the collecting means 8 and the aperture diaphragm 9 are synchronized such that the first order intensity maximum $IM_{m=1}$ is generated centrally at the aperture opening $10_1$.

Figure 4:
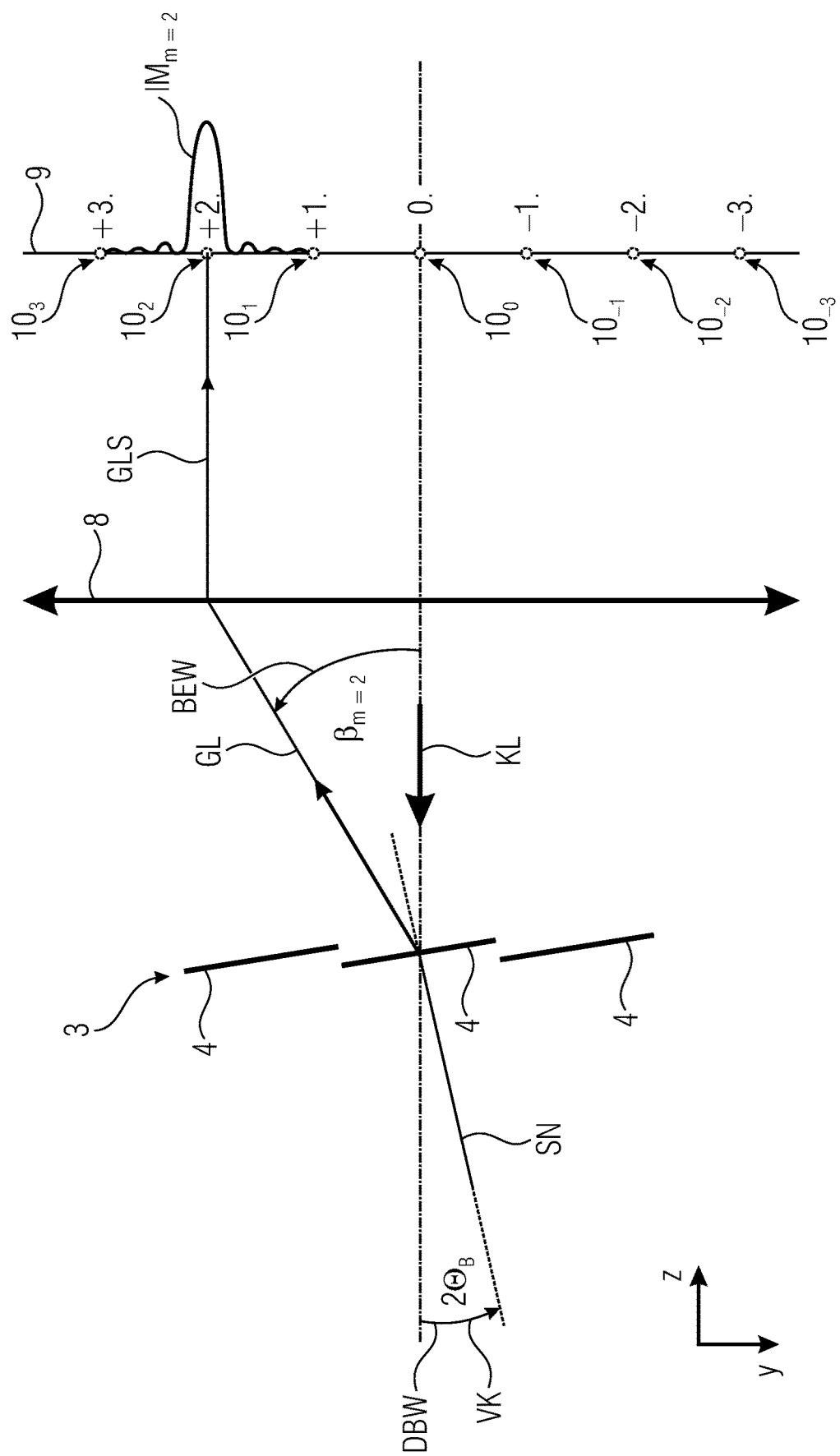
FIG. 4 is an outline where a second order intensity maximum is generated.

FIG. 4 shows a diagram where a second order intensity maximum is generated. In contrary to FIG. 3, the tilting angle VK corresponds to twice the blaze angle DWW, such that the coherent light KL is completely diffracted into the second order. The micromirror array 3, the collecting means 8 and the aperture diaphragm 9 are synchronized such that the second order intensity maximum $IM_{m=2}$ is centrally generated at the aperture opening 102. By selecting other integer multiples of the blaze angle BW, the intensity maxima IM can also be generated at the further aperture openings 10.

Figure 5:
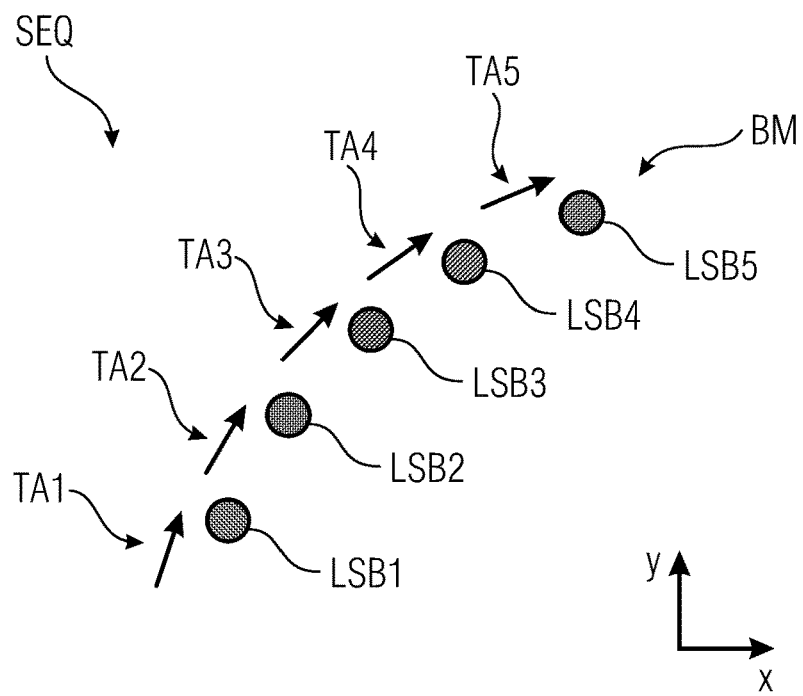
FIG. 5 is a schematic illustration of a sequence for generating an illumination pattern.

FIG. 5 shows a schematic illustration of a sequence for generating an illumination pattern BM. The sequence STQ includes clocks TA1 to TA5 which are sequentially processed in increasing numbering. In this way, the illumination pattern BM, which includes the light beams LSB1 to LSB5, gradually results.

According to a development of the invention, the control means 2 is configured such that the sequence SEQ for generating the illumination pattern BM comprises a plurality of clocks TA, wherein in each clock TA at least one of said light beams LSB is generated.

According to an advantageous development of the invention, the control means 2 is implemented such that the clocks TA each comprise a first partial clock for tilting the micromirrors 4 in which the illumination means 5, 6, 7 is switched off, and a second partial clock for generating at least one of said light beams LSB in which the micromirrors 4 are unmoved and the illumination means 5, 6, 7 generates the planarly incident coherent light KL.

As indicated in FIG. 5, the light beams LSB1 to LSB5 are generated successively in time. For this, the micromirror array 3 can be dynamically programmed as 2D blazed grating 3. The development as blaze grating means that all individual mirrors 4 are tilted in the same direction. A specific 2D tilting angle fulfilling the blaze condition belongs to each individual diffraction disk IM in the Fourier plane FEF. The minimum period between generating two subsequent diffraction points IM is given by the programming cycle of the micromirror array 3. The pulse repetition rate of the laser 5 has to be at least as great as the clock rate of the micromirror array 3 in order to allow synchronous operation.

Figure 6:
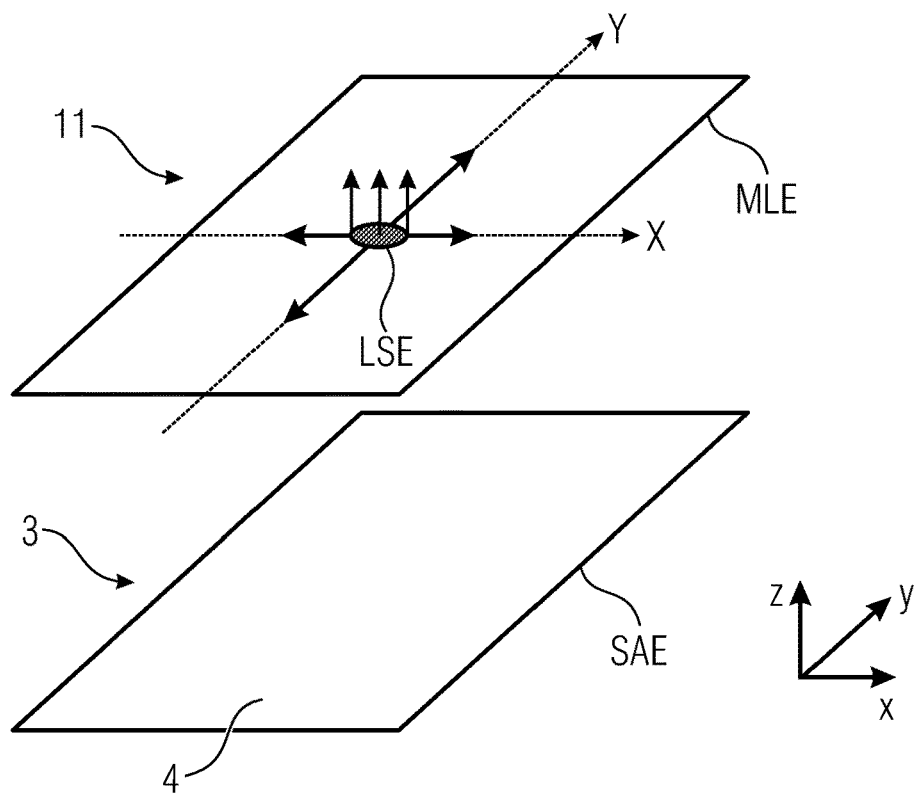
FIG. 6 is an outline for illustrating the mode of operation of an inventive apparatus where the micromirrors are tiltable around two axes.

FIG. 6 shows an outline for illustrating the mode of operation of an inventive apparatus 1 where the micromirrors are tiltable around two axes.

According to an advantageous development of the invention, the control means 2 is implemented such that exactly one light beam LSB is generated in each clock TA, in which the micromirrors 4 are tilted such that the micromirrors 4 are oriented in parallel.

According to a practical development of the invention, the micromirrors 4 are tiltable around two axes by the control means 2, wherein a position of said intensity maximum IM of the collected light GSL on the aperture diaphragm array 2 is controllable two-dimensionally by the control means 2. Hereby, it is possible to also adjust the position of the respectively generated light beam LSE two-dimensionally.

Figure 7:
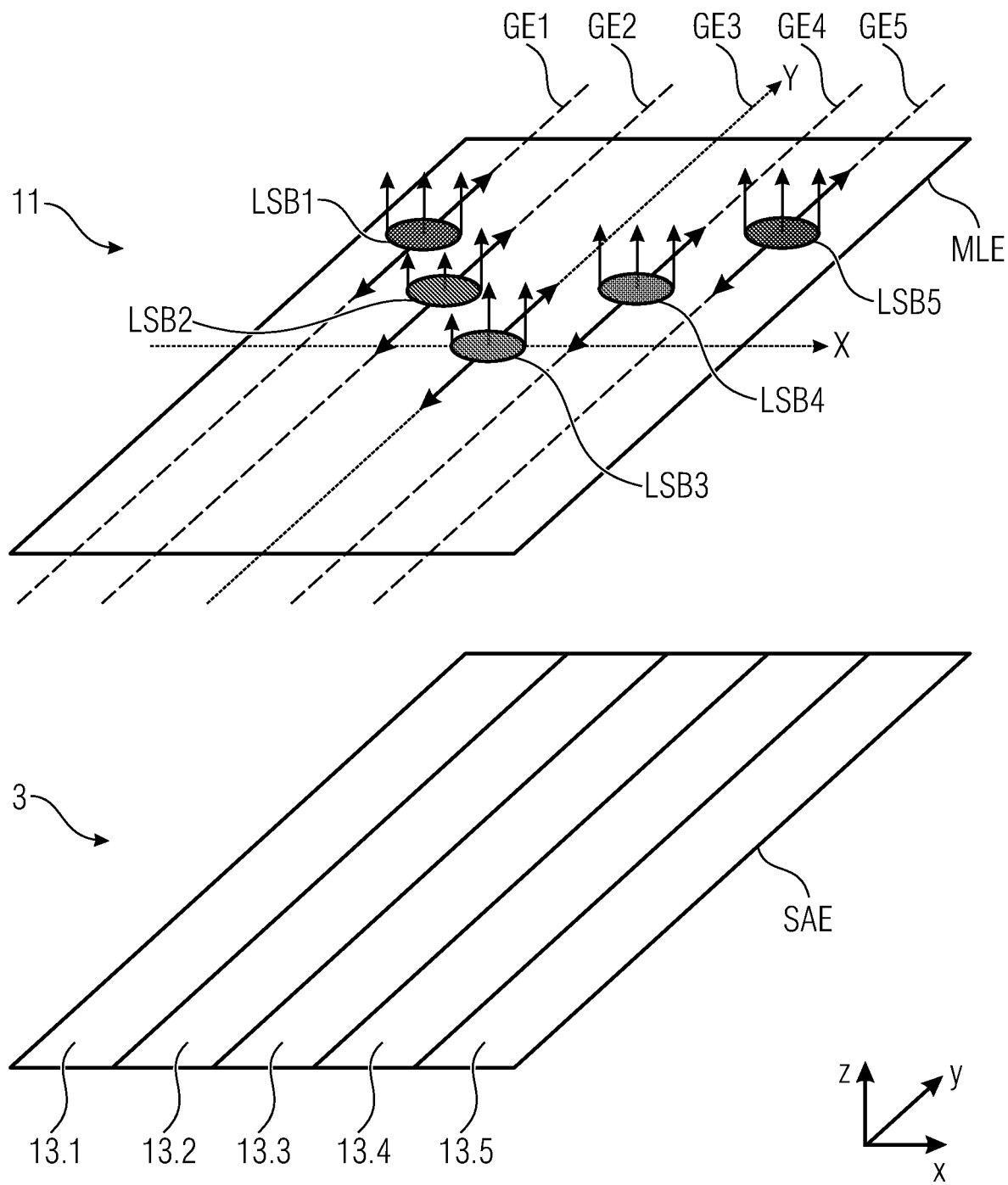
FIG. 7 is an outline for illustrating the mode of operation of an inventive apparatus where the micromirrors are tiltable around an axis.

FIG. 7 shows an outline for illustrating the mode of operation of an inventive apparatus where the micromirrors are tiltable around an axis.

According to an advantageous development of the invention, the control means 2 is implemented such that in each clock TA several light beams LSB are generated, in particular simultaneously, wherein each of the several light beams LSB is generated by a group 13 of micromirrors 4, which are tilted such that the micromirrors 4 are oriented in parallel within one of the groups 13 of micromirrors 4. Exemplarily, groups 13.1 to 13.5 are illustrated, wherein group 13.1 generates the light beam LSB1, group 13.2 the light beam LSB 2, group 13.3 the light beam LSB3, group 13.4 the light beam LSB 4 and group 13.5 the light beam LSB 5.

According to a practical development of the invention, the micromirrors are each respectively tiltable around exactly one axis by the control means 2, wherein positions of several of said intensity maxima IM of the collected light GLS are respectively controllable by the control means 2 on the aperture diaphragm array 9, each along a straight line GE, wherein the straight lines GE of different intensity maxima IM run spaced apart and parallel. Thereby, it is possible to adjust the positions of the exemplarily shown light beams LSB1 to LSB5 along the straight lines GE1 to GE5. Two-dimensional illumination patterns BM become possible in that the straight lines GE1 to GE5 run in parallel but are spaced apart.

Figure 8:
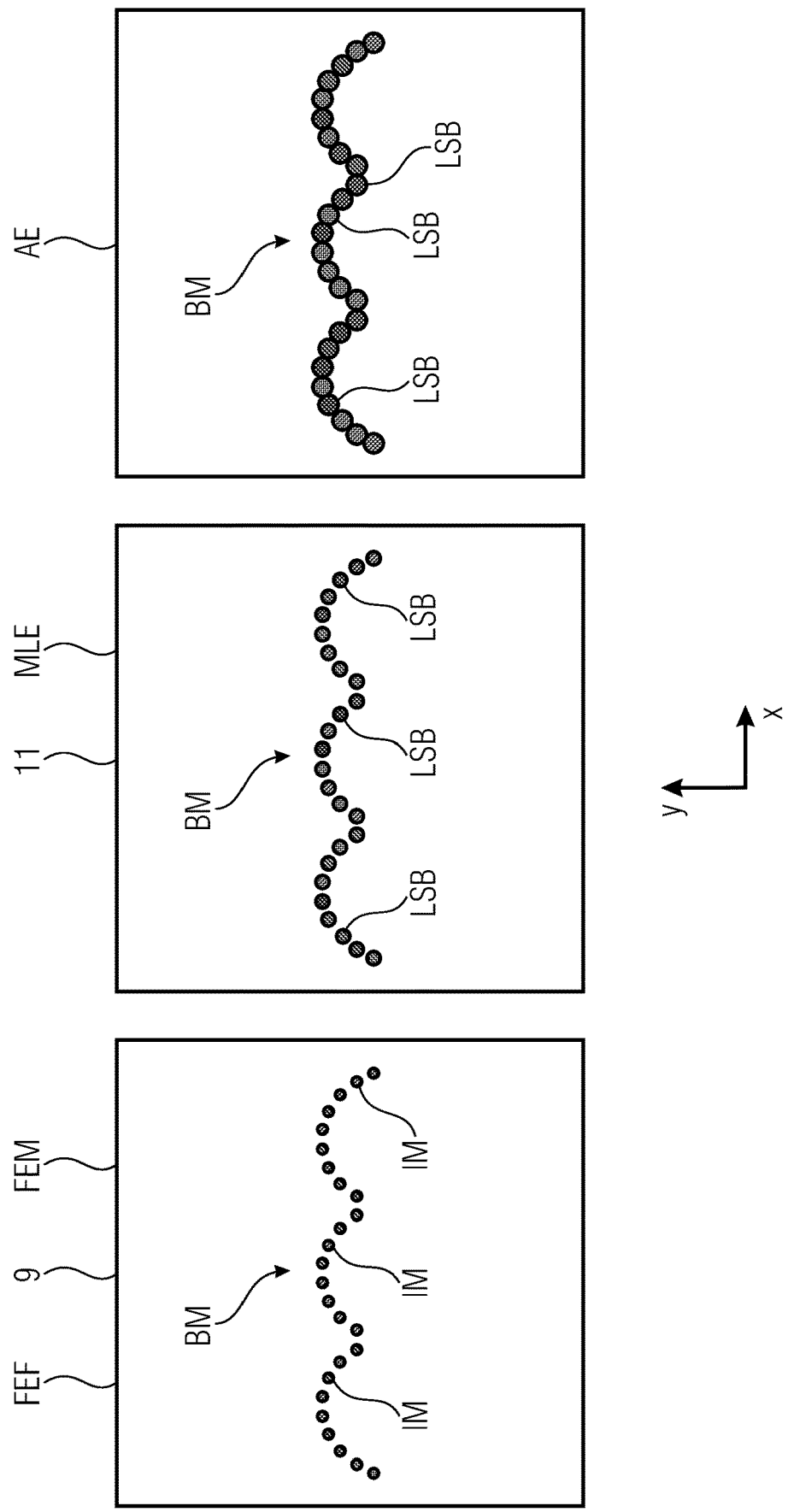
FIG. 8 is an outline for illustrating the divergence of the light beams.

FIG. 8 shows an outline for illustrating the divergence of the light beams. For generating the light sheet BM illustrated at the right and lying in the operating plane AE, a plurality of light points IM can be generated in sequence in the Fourier plane FEF of the collecting means 8, as illustrated on the left. In a time-integrated manner, the plurality of intensity maxima IM in the Fourier plane FEF shown on the left results. Each individual intensity maximum is mapped to infinity by an allocated microlens 12. By the divergence of the light beams LSB, the cross-sections of the light beams expand starting from the plane MLE of the microlenses 12 illustrated in the center of the figure into the operating plane AE. Thereby, the illumination pattern in the shape of wavelike light sheet shown on the right results in the operating plane AE. Integrating the intensities of the individual intensity maxima is in practice taken on by a camera. The exposure period of the camera chip has to be longer than the time that is necessitated to build up the entire light sheet BM.

Figure 9:
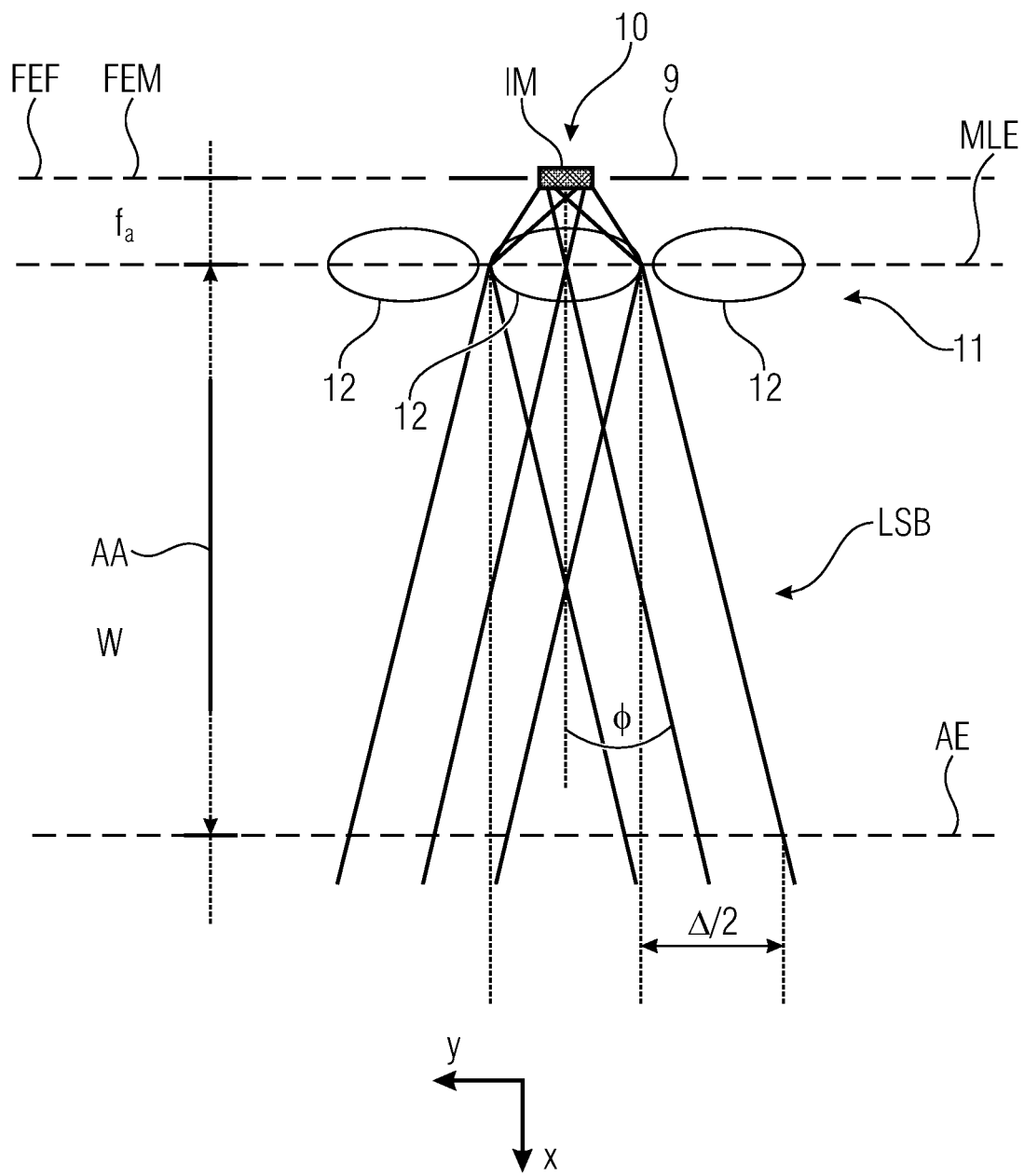
FIG. 9 is a further outline for illustrating the difference of the light beams.

FIG. 9 shows a further outline for illustrating the difference of the light beams.

Naturally, a light beam LSB generated according to FIG. 1 will diverge in propagation direction, which corresponds to a smudging of the light sheet profile. Thus, in FIG. 9, in the plane of the microlenses MLE, a cross-section of the light beam LSB is smaller than in the operating distance AA. The expansion is proportional to the size of the intensity maxima IM in the Fourier plane FEM. An ideal light cylinder would have the diameter of a microlens 12. Due to the finite size of the intensity maximum IM, the real light cylinder expands to a cone. Its widening in the operating distance AA is simply calculated by $\Delta = d_{spot} \, w/f_a$, with $\Delta$ being the widening, $d_{spot}$ the width of the intensity maximum IM, w the operating distance AA and $f_a$ the focal length of the microlens array. According to diffraction theory, the width of the intensity maximum IM is the smaller the greater the used area of the micromirror array 3 by which the intensity maximum IM is generated. Here, it becomes obvious why it is advantageous when the entire area of the micromirror array 3 is used for generating an intensity maximum IM. In other words, the divergence can be reduced, such that the light beams LSB are almost cylinder-shaped. With the help of the dimensioning equation $D_{MMA} \, f_a = D_a \, f$, with $D_{MMA}$ being the diameter of the micromirror array 3, $D_a$ the diameter of the microlens 12 and f the focal length of the collecting means 8, the thickness of the light sheet can be calculated. For w=20 cm and $\lambda$=532 nm, a minimum thickness of the light sheet of 1 mm can be realized (without derivation).

As has already been mentioned, generating an illumination pattern is also possible with a micromirror array 3 whose micromirrors 4 are only tiltable one-dimensionally. For this, the area of the micromirror array 3 can be divided into segments 13. Here, each segment 13 generates a diffraction spot IM. Then, the divergence of the illumination pattern DRM is greater and the obtainable curvature lower than when using a two-dimensionally tiltable micromirrors.

Further, convergent or divergent illumination patterns are possible: if, in FIG. 1, a spherically curved microlens array is used instead of a planar one, the light beams LSB will be convergent or divergent in a fan-like manner. Thereby, in the first case, the light sheet BM can propagate in tapering rooms without scattering at the walls. In the second case, the width of the light sheet can be enlarged. The fan-out angle can correspond to the divergence angle.

According to a development of the invention, adjacent light beams LSB of the illumination pattern BM overlap in an operating distance AA measured from the microlens array, such that a line-shaped illumination pattern BM results.

According to a development of the invention, the aperture openings 10 have a round cross-section.

Figure 10:
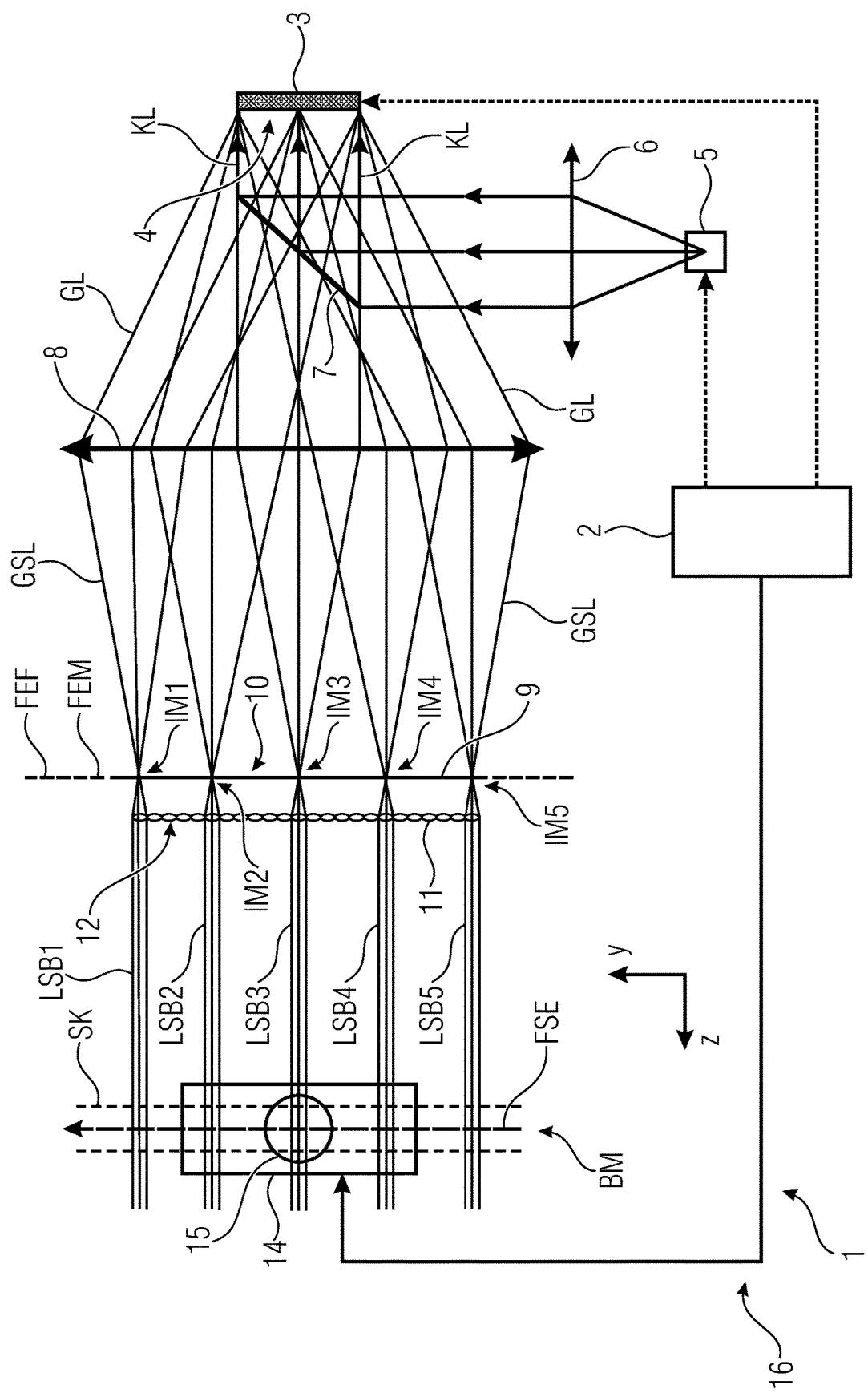
FIG. 10 is an inventive apparatus for optical determination of velocity fields in fluid flows in a schematic illustration.

FIG. 10 shows an inventive apparatus 16 for optical determination of velocity fields in fluid flows in a schematic illustration.

The apparatus 16 for optical determination of velocity fields in fluid flows FSE includes:
an apparatus 1 for generating a two-dimensional illumination pattern BM of light beams LSB according to one of claims 1 to 14; and
a camera 14 for capturing the illumination pattern BM, wherein an objective 15 of the camera 14 is disposed such that an optical axis of the objective 15 is disposed transversally to a propagation direction of the light beams LSB of the illumination pattern BM, and wherein an exposure time of the camera 14 is controllable by the control 2 such that all light beams LSB of one of the illumination patterns BM are captured in an image BI taken by the camera.

According to a practical development of the invention, the objective 15 is a telecentric objective 15.

In order to use the described apparatus 1 within PIV, the velocity of a trace particle in the fluid flow FSE cannot be arbitrarily high. Generally, the particle is to be slower than the thickness of the light sheet BM divided by the time distance of the captured double image. Exemplarily, for a light sheet thickness of 1 mm and a time distance of 100 µs, a maximum allowable velocity of the flow of 10 m/s results.

The micromirror array 3 and the illumination means 5, 6, 7 can be synchronized such that the illumination means exposes the micromirror array 3 exactly at that time when its micromirrors 4 are completely aligned.

In FIG. 10, a transparent flow channel SK in which the fluid flows FSE to be examined are guided is disposed between the microlens array 11 and the objective 15 of the camera 14.

The optical mapping of the trace particles residing within the structured light sheet can be performed by telecentric objectives. Thereby, perspective distortions and defocusing effects are suppressed. When selecting a standard objective, the perspective distortions can be calibrated out. For this, a light beam is statically generated at a position in the room. Scattering centers within the light cone can serve as calibration objects. This procedure can be repeated for any further positions in the room.

Figure 11:
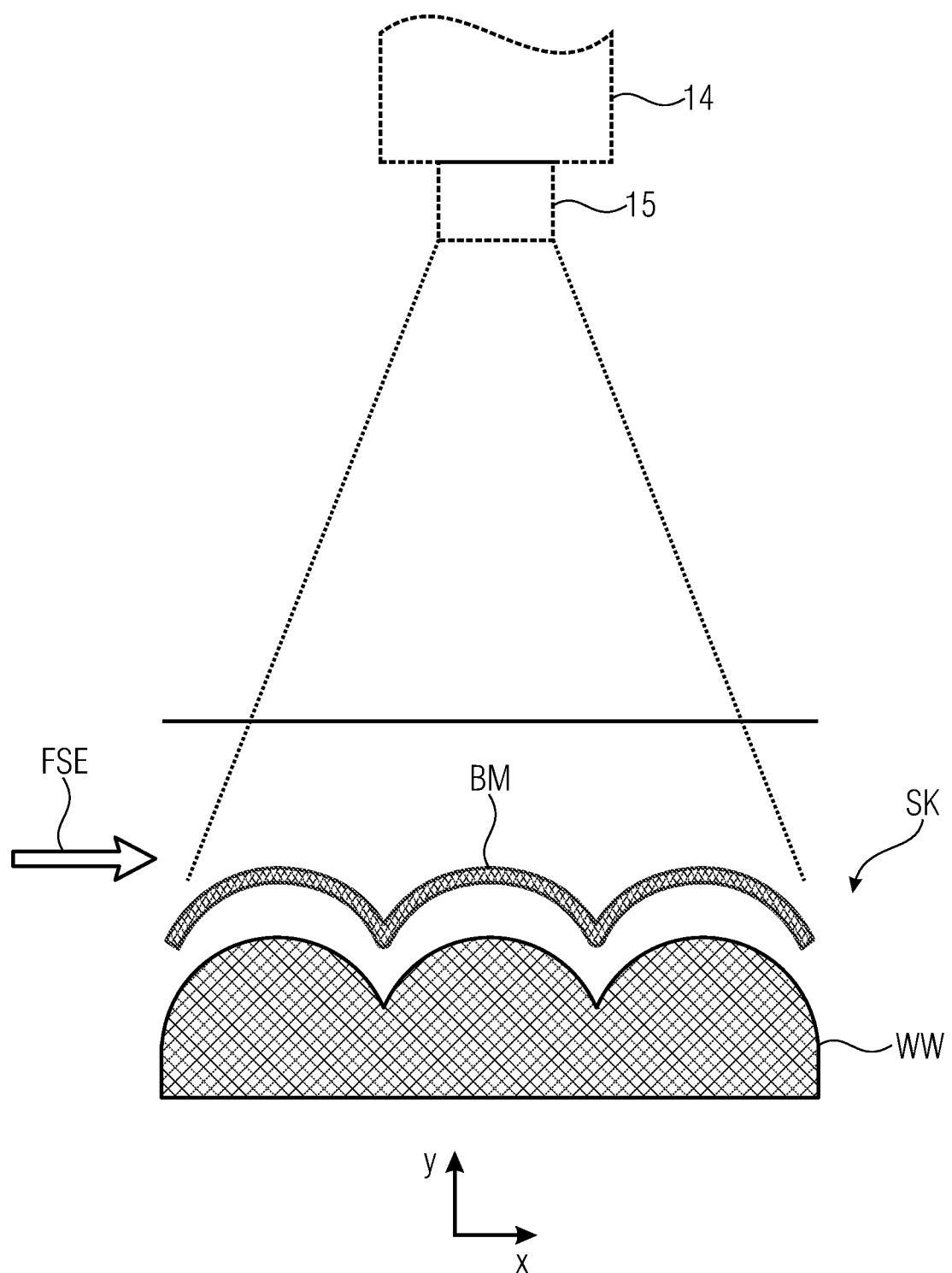
FIG. 11 is an outline for illustrating the mode of operation of the apparatus for optical determination of velocity fields in fluid flows.

Complex-shaped surfaces can minimize flow resistances or can direct flows. The resulting flows are of scientific interest, however, their measuring, however, is a challenge. Scattered light at the wall can superimpose scattered light reflected by the trace particles. Thereby, the signal to noise ratio can be lowered. Specifically, a planar light sheet would be scattered, for example, at the "hills" of a wavy surface. The sinks of the surface might not be illuminated. An illumination following the wall at least in 2D (see FIG. 11) is thus superior to the classical planar light sheet. FIG. 11 illustrates that by means of the inventive apparatus practically any 2D geometry can be generated for an illumination pattern. These include both curvatures of any radii as well as steps or closed geometric figures such as circles or polygons. The light sheet cannot be curved in depth. The same is straight in the propagation direction of light.

The velocity by which the light sheet is generated can be increased by segmenting the MMA mirror area proportionally to the segment number. With each segment, an intensity maximum IM is generated simultaneously in the Fourier plane FEF. The parallel operation of several MMAs could increase the write velocity further.

Volumina can be scanned by sequentially generating several illumination patterns BM in the room. 3D structured illumination is used for 3D flow measurement methods, as described, e.g., in [3] or also for triangulation as described, e.g., in [4]. With the inventive apparatus 1, a compact 3D PIV system can be built which generates illumination patterns of any shape.

Technical fields of application are in particular:
1. Generating free-form light sheets having 1 to 3 mm thickness and a very high power density. The width of the light sheet depends on the diameter of the collecting means. Possible shapes of the free-form light sheet profiles are: hyperboles, semicircles, polygons, steps, waves, which are particularly used in 2D flow measurement.
2. Generation of structured illumination for 3D velocity measurement methods, such as for scanning tomographic triangulation methods.
3. Generating projection illumination for 3D shape measurement.
4. 3D microscopy.
5. Optically induced transport.

The invention allows a compact structure for the inventive apparatus for generating illumination patterns since the same comprises no rotating reflecting bodies of high masses.

With simultaneous high writing velocity of the light sheet, high light power can be used, since the overall area of the used micromirrors 4 can be several cm$^2$.

The writing velocity at which the light sheet BM can be structured is constant across the whole width of the light sheet BM. The writing velocity at which several lights sheets offset within the room can be generated is constant.

FIG. 11 shows a further outline for illustrating the mode of operation of the apparatus 16 for optical determination of velocity fields in fluid flows FSE. A flow channel SK is illustrated, which comprises a wave-like wall WW on one side. The illumination pattern BM is adapted to the wave-like wall WW, such that measuring the fluid flow FSE close to the wall is possible. Here, the camera 14 with the objective 15 is disposed such that an optical axis of the objective 15 is disposed transversal to a propagation direction of the light beams LSB of the illumination pattern BM.

Figure 12:
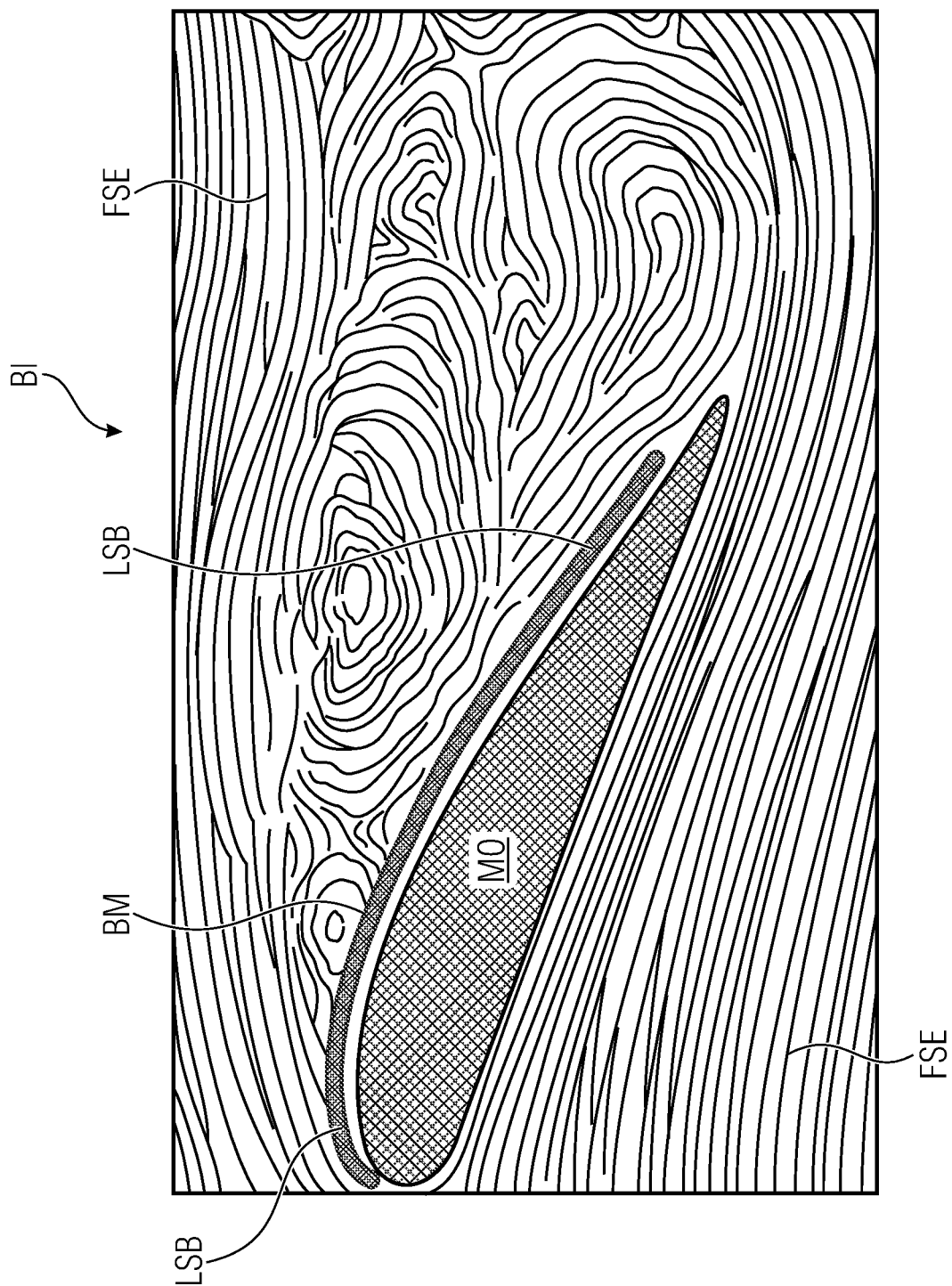
FIG. 12 is a fluid flow along a measurement object with a light sheet following a contour of the measurement object.

FIG. 12 shows a fluid flow FSE along a measurement object MO. Here, the illumination pattern is also adapted to a wall of the measurement object MO.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:
1. Apparatus for generating a two-dimensional illumination pattern of light beams, comprising:
a controller for controlling a sequence for generating the two-dimensional illumination pattern of light beams;
an illuminator for generating planarly incident coherent light, which is controllable by the controller;

a micromirror array for diffracting planarly incident coherent light generated by the illuminator, the micromirror array comprising a plurality of micromirrors, which are each tiltable around at least one axis by the controller;

a collector for collecting light diffracted from the micromirror array; and a microlens array comprising a plurality of microlenses that are different from the collector, the microlens array for receiving light collected from the collector and for forming the light beams, wherein the plurality of microlenses comprise a common Fourier plane, which is disposed congruently with a Fourier plane of the collector;

wherein the controller is configured for tilting the micromirrors such that in the Fourier plane of the collector, intensity maxima of the light collected by the collector can be generated, wherein the intensity maxima are each allocated to one of the microlenses, and wherein from the respectively generated intensity maximum, one of the light beams is generated by the respectively allocated microlens.

2. Apparatus according to claim 1, wherein in the Fourier plane of the collector an aperture diaphragm array comprising a plurality of aperture openings is disposed, wherein the aperture openings are each allocated to one of the microlenses.

3. Apparatus according to claim 1, wherein the controller is configured for tilting the micromirrors such that a tilting angle of the micromirrors corresponds to an integer plurality of a blaze angle.

4. Apparatus according to claim 1, wherein the controller is configured such that the sequence for generating the illumination pattern comprises a plurality of clocks, wherein at least one of said light beams is generated in each clock.

5. Apparatus according to claim 1, wherein the controller is configured such that the clocks each comprise a first partial clock for tilting the micromirrors in which the illuminator is switched off, and a second partial clock for generating at least one of said light beams in which the micromirrors are unmoved and the illuminator generates the planarly incident coherent light.

6. Apparatus according to claim 4, wherein the controller is configured such that in each clock exactly one light beam is generated, in which the micromirrors are tilted such that the micromirrors are oriented in parallel.

7. Apparatus according to claim 4, wherein the controller is configured such that in each clock several light beams are generated, wherein each of the several light beams is generated by a group of micromirrors, which are tilted such that the micromirrors are oriented in parallel within one of the groups of micromirrors.

8. Apparatus according to claim 1, wherein the micromirrors are tiltable around two axes by the controller, wherein a position of said intensity maximum of the collected light on the aperture diaphragm array is controllable two-dimensionally by the controller.

9. Apparatus according to claim 1, wherein the micromirrors are each tiltable around exactly one axis by the controller, wherein positions of several of said intensity maxima of the collected light on the aperture diaphragm array are each controllable by the controller along a straight line, wherein the straight lines of different intensity maxima run spaced apart and in parallel.

10. Apparatus according to claim 1, wherein the micromirrors are disposed along a common mirror array plane.

11. Apparatus according to claim 1, wherein the illuminator is configured such that the planarly incident coherent light is incident perpendicularly onto the micromirror array.

12. Apparatus according to claim 1, wherein the illuminator comprises a laser, advantageously a pulse laser.

13. Apparatus according to claim 1, wherein the aperture openings comprise a round cross-section.

14. Apparatus according to claim 1, wherein adjacent light beams of the illumination pattern overlap in an operating distance measured from the microlens array, such that a line-shaped illumination pattern results.

15. Apparatus according to claim 1, wherein the microlenses are disposed in one plane.

16. Apparatus for optical determination of velocity fields in fluid flows, comprising:

an apparatus for generating a two-dimensional illumination pattern of light beams according to claim 1; and a camera for capturing the illumination pattern, wherein an objective of the camera is disposed such that an optical axis of the objective is disposed transversally to a propagation direction of the light beams of the illumination pattern, and wherein an exposure time of the camera is controllable by the control such that all light beams of one of the illumination patterns are captured in an image taken by the camera.

17. Apparatus according to claim 16, wherein the objective is a telecentric objective.

* * * * *